(12) United States Patent
Hunt et al.

(10) Patent No.: X4479
(45) Date of Patent: Jun. 22, 1826

(54) SPINNING FLAX & HEMP

(76) Inventors: Walter Hunt; Willis Haskins

United States Patent

Patent No.: X4479

[illegible] June 22nd 1826
[illegible] Hunt & Willis [illegible]
[illegible] Patent.

The schedule referred to in these Letters Patent, & making part of the same containing a description in the words of the said [illegible] Hunt & Willis [illegible] [illegible] of their improvement in the machine for [illegible] flax & hemp.

The frame is about [illegible] feet [illegible] and a half wide, & about three [illegible] or [illegible] according to the [illegible] of [illegible] — [illegible] are framed [illegible] [illegible] the [illegible] and [illegible] at or about ten inches from the [illegible] of each. Four cross [illegible] are framed [illegible] [illegible] in the same [illegible] [illegible] [illegible] [illegible] framed, one to the upper & lower [illegible] of each side of the frame at [illegible] [illegible].

The main arbor is of iron, on one end of which is the large wheel about [illegible] feet in diameter. & when operated by hand there is [illegible] a crank on the end. — The small arbor [illegible] made with two Cranks —

The intermediate cylin[der] [illegible] drum is about five inches in diameter [illegible] one end it has a number of grooves of [illegible] [illegible];

The small drum or cylinder is [illegible] [illegible] with the like grooves. The flyer are made of iron or other metal and are sim[ilar] [illegible] the common [illegible] — The [illegible] [illegible] [illegible] and made on the [illegible] of [illegible] or [illegible]

The evener is constructed in the following man-
ner: a small tube is made of iron [illegible] three eighths
of an inch in diameter and two inches in length thro'
which the thread is [illegible] pass. at each end are shoulders
on which it turns. Near the middle of the tube is
a notch filed thro' the hole. — On this tube is a wheel
about one inch & a half in diameter & sufficiently
loose to admit of its playing easily backward &
forward, but is prevented from turning on the tube
by a cog on the tube moving in a gain or groove
cut in the wheel. —
To this wheel is fixed a dog which
is calculated to answer to the notch in the tube
and when pressed into the notch [illegible] [illegible] the
thread. —
There are as many eveners as there are
flier[s] to a machine, and are placed on slides —
The large platform is about two feet [illegible]
in length with as many troughs as there are flier[s]
to a machine & the same number of flutes or gains
by the side of each trough. —
The troughs at one end are large enough
to receive a small [illegible] of [illegible]; at the other
end or the end near the rollers they are contracted
so as to admit only enough for a thread.
The small platform is about eight inch-
es in length extending in width across the machine
[illegible] flutes or gains for the slides which carry the eveners
The large sliding bar is a board four or five inches
wide, with as many hooks attached to it as there are
slides which carries the feeders. — The small sliding
bar is about two inches wide with as many standards
as there are eveners. — The rollers are of wood and
[illegible]

about two inches in diameter, covered with [illegible] elastic substance and pressed together by screws. The large slides are of wood about one foot three inches in length and fitted to the fluted [illegible] of the large platform. The small slides are about five inches in length fitted to the flutes or gains of small platform.—

The main arbor is placed on the middle [illegible] near the upper [illegible], the large wheel being on the back side of the frame; [illegible] of the large wheel are a [illegible].

The small arbor is placed on the same [illegible] near the foot of each. it has a [illegible] with a number of grooves of different [illegible] and is carried by a band from the [illegible] of the large wheel; the cranks of the small arbor by means of [illegible] carry the large [illegible] bar, which moves horizontally [illegible] [illegible] under the [illegible] [illegible] [illegible] [illegible] works of the bar [illegible] up that the platform is [illegible] cut for that purpose more [illegible] together with the [illegible] [illegible] backward & forward.

The intermediate cylinder or drum is placed [illegible] above the lower cross bar at the right hand of the frame and turned by a band from the large wheel. The large platform is on the top of the frame at the [illegible] hand from the [illegible]. [illegible] at the right hand and the small platform [illegible] [illegible] the large platform [illegible] [illegible].—

[illegible] small [illegible] [illegible] is placed [illegible] [illegible] directly under [illegible] [illegible] [illegible]

and is turned by the band of the large pully round the cyl-
-inder. [illegible] the bands which carry the fliers, the bands
being crossed so as to turn the evener the opposite way
from that in which the flyers turn, but with nearly the same
velocity.

The fliers are placed horizontally on the top
of the frame at the right hand from the crank at
the end, and are turned by bands from the in-
-termediate cylinder or drum. A small shaft
is placed horizontally nearly under the fliers &
turned by a band from the hub of the large wheel
with a crank on each end which by [illegible] means
of pitmans carries the small sliding bar and
gently moves the eveners horizontally backwards & forwards
at the same time, that the small cylinder or drum
by means of the bands gives them their rotary
motion. As the eveners are moved towards the
fliers, the dog of the spring is pressed into the
notch of the tube and when moved back towards
the rollers the dog is forced from the notch.

The rollers are placed near
the middle of the machine at the ends of the [illegible]
and are turned by a band from a pulley or wheel
on the small arbor having a number of grooves of
different sizes.—

Between the evener and the flier
is a roller turning in some liquid over which
the thread is drawn & wet.— Immediately over the
rollers is a brake which strikes the flax from the
feeders and presses it between the rollers being
operated by a cord attached to a lever which
is acted upon by a projecting cog in the small
arbor.— In the side of each trough at about the the middle is a tumbler over which the feeder passes and as it passes over the end of the [illegible] the tumbler [illegible] the feeder & lets it fall into the flax and as the feeder [illegible] back towards the roller the tumbler swings so as not to effect the feeder. The feeders [illegible] closed & closed by the hooks of the large sliding bar acting upon a block lever placed on the back of the feeder.

Manner of using

The flax as it comes from the hackle is placed in the trough. then by turning the crank each of the feeders immediately [illegible] a broken [illegible] of flax or [illegible] thread & carries it to the rollers by means of the [illegible] on its passing thro' the rollers a thread is [illegible] drawn from each flier passed thro' the [illegible] [illegible] & attached to the flax already passed thro' the rollers, [illegible] [illegible] [illegible] turn the crank by hand or [illegible] [illegible] [illegible] [illegible] and the feeders [illegible] backwards & forward [illegible] & carries to the rollers continually a broken [illegible] of flax for the thread, and [illegible] passes thro' the [illegible] on moving forward the [illegible] [illegible] the [illegible] to [illegible] the flax which has passed thro' the rollers, then [illegible] moving towards the flyers each dog being [illegible] into the [illegible] in the [illegible] [illegible] on [illegible] [illegible] [illegible] the threads & [illegible] [illegible] [illegible] [illegible] out to [illegible] [illegible] [illegible] the flier at the same time taking up the threads [illegible] [illegible] as the [illegible] draw it out and make it [illegible]. The principles which

[illegible]

United States Patent

Patent No.: X4479 we particularly claim in the described machine are those embraced in the rollers, the leaders and the corners.

Martinsburg New York May 20th 1836

Witnesses

Ira Cook

Andrew H. Rice

Recorded & recorded anew Feb 20th 1835.

DRAFTSMAN'S DIVISION.

*All communications should be addressed to*
"The Commissioner of Patents
Washington, D. C."

**2—328 *a*.**

*DEPARTMENT OF THE INTERIOR,*

United States Patent Office,

*Washington, D. C.,* ........ *189*...

*SIR:*

*The printed* ...... copies ...... *of Patent No.* Hunt & Hoskins June 22 1826

...... are ...... *exhausted.*

*As soon as printed a copy will be mailed you to complete your order.*

*By direction of the Commissioner:*

*Very respectfully,*

..............................

*Chief Clerk.*

81431b6-97-5m